United States Patent
Cain

(10) Patent No.: US 12,003,556 B2
(45) Date of Patent: *Jun. 4, 2024

(54) METHODS OF STREAMING MEDIA FILE DATA AND MEDIA FILE SERVERS

(71) Applicant: Grass Valley Limited, Berkshire (GB)

(72) Inventor: James Westland Cain, Berkshire (GB)

(73) Assignee: GRASS VALLEY LIMITED, Newbury (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,707

(22) Filed: Jul. 5, 2022

(65) Prior Publication Data

US 2022/0337645 A1  Oct. 20, 2022

Related U.S. Application Data

(63) Continuation of application No. 16/159,100, filed on Oct. 12, 2018, now Pat. No. 11,418,562, which is a
(Continued)

(30) Foreign Application Priority Data

Apr. 15, 2016 (GB) ..................... 1606596

(51) Int. Cl.
*H04N 21/845* (2011.01)
*H04L 65/60* (2022.01)
(Continued)

(52) U.S. Cl.
CPC ..... *H04L 65/60* (2013.01); *H04N 21/234309* (2013.01); *H04N 21/23439* (2013.01);
(Continued)

(58) Field of Classification Search
None
See application file for complete search history.

(56) References Cited

U.S. PATENT DOCUMENTS

| 11,418,562 B2 * | 8/2022 | Cain ................ H04N 21/23439 |
| 2003/0093790 A1 | 5/2003 | Logan |

(Continued)

FOREIGN PATENT DOCUMENTS

| GB | 2493944 A | 2/2013 |
| WO | 2012156224 A1 | 11/2012 |
| WO | 2013114082 A1 | 8/2013 |

OTHER PUBLICATIONS

International Search Report and Written Opinion dated Jul. 26, 2017, regarding PCT/GB2017/051056.

*Primary Examiner* — Jefferey F Harold
*Assistant Examiner* — Charles N Hicks
(74) *Attorney, Agent, or Firm* — ARENTFOX SCHIFF LLP

(57) ABSTRACT

A media file system, apparatus, computer program product and method are provided for of streaming media file data. An exemplary method includes receiving a request for media file data for a desired time, and determining from the desired time an available segment of media file data, wherein the segment includes media file data from a start time to an end time. The method further including returning the available segment of media file, wherein the step of returning the available segment of media file data includes returning information indicative of the start time to end time covered by the media file data of the available segment.

20 Claims, 6 Drawing Sheets

Related U.S. Application Data continuation of application No. PCT/GB2017/051056, filed on Apr. 13, 2017.

(51) Int. Cl.
  *H04N 21/2343* (2011.01)
  *H04N 21/262* (2011.01)
  *H04N 21/2662* (2011.01)
  *H04N 21/472* (2011.01)
  *H04N 21/61* (2011.01)
  *G11B 27/031* (2006.01)

(52) U.S. Cl.
  CPC ... *H04N 21/26283* (2013.01); *H04N 21/2662* (2013.01); *H04N 21/47202* (2013.01); *H04N 21/6125* (2013.01); *H04N 21/8456* (2013.01); *G11B 27/031* (2013.01)

(56) References Cited

U.S. PATENT DOCUMENTS

| | | |
|---|---|---|
| 2011/0019976 A1 | 1/2011 | Park |
| 2012/0011270 A1 | 1/2012 | Priddle |
| 2012/0233345 A1 | 9/2012 | Hannuksela |
| 2012/0290937 A1 | 11/2012 | Rothschild |
| 2014/0215545 A1 | 7/2014 | Liang et al. |
| 2014/0237077 A1 | 8/2014 | Cain et al. |
| 2014/0289257 A1 | 9/2014 | Cain et al. |
| 2015/0012584 A1 | 1/2015 | Lo |
| 2015/0325268 A1 | 11/2015 | Berger et al. |
| 2016/0105708 A1 | 4/2016 | Packard |
| 2016/0112732 A1 | 4/2016 | Li et al. |

* cited by examiner

METHODS OF STREAMING MEDIA FILE DATA AND MEDIA FILE SERVERS

CROSS REFERENCE TO RELATED APPLICATIONS

The present application is a continuation of U.S. patent application Ser. No. 16/159,100, filed Oct. 12, 2018, which is a continuation of PCT/GB2017/051056 filed Apr. 13, 2017, which claims priority to GB Patent Application No. 1606596.3, filed Apr. 15, 2016, the entire contents of each of which are incorporated herein by reference.

FIELD OF THE INVENTION

The present invention concerns methods of streaming media file data, and media file servers.

BACKGROUND OF THE INVENTION

It has become common to stream video over the Internet. FIG. 1 is a schematic diagram of a known video streaming computer system. The video streaming computer system comprises a file system 31, which comprises a data store 32, a file record database 33, and a file system gateway 34. The file system gateway 34 is in communication with an Internet Information Services (IIS) web server 35 (as developed by Microsoft). The IIS web server 35 communicates via the Internet 36 with a personal computer 37 running a video streaming client application 38, in this case a Silverlight application. The IIS web server 35 streams video to the client application 38 using the Smooth Streaming media service.

As is well known, the Smooth Streaming media service provides video in the form of fragmented MPEG-4 files at a quality level appropriate to the bandwidth over which the video is streamed. The structure of a fragmented MPEG-4 is shown in FIG. 2. A file 20 comprises a header 21, a plurality of "moof"s (movie fragments) 22a, 22b, 22c and so on, and a footer 23. Each moof provides a portion of video of a fixed duration, for example two seconds of video.

FIG. 2 further shows the internal structure of a moof. A moof comprises a header file 25 and a plurality of GOPs ("groups of pictures") 26a, 26b to 26c. A GOP is a series of images making up a particular sequence of video. The images are compressed, and as can be seen from FIG. 1 this results in the GOPs being of different lengths (i.e. being made up of a different number of bytes). One reason for this is that the video a GOP represents will compress to a different size depending on the nature of the images making up the video; for example, as compression techniques include identifying the differences between images in a series, a series of very similar images will generally be compressed to a much smaller size than a series of images in which differ substantially from each other. The location of a GOP in a file will therefore depend on the size of the preceding GOPs.

The header 21 contains in XML format a "manifest" giving details of the moofs in the file 20 and the time ranges for the video they contain. For example, the manifest of the header 21 may indicate that moofs 22a, 22b and 22c provide video in the time ranges 0-2 seconds, 2-4 seconds and 4-6 second respectively.

The footer 23 contains in XML format an index giving details of the byte ranges for the moofs in the file 20. As can be seen in FIG. 2, even though each moof contains a fixed duration of video, the moofs themselves are of variable length. Thus, the byte range for a moof in the file 20 cannot be determined merely from its time range, and the index of the footer 23 is required in order to find a particular moof within the file 20.

When video is requested by the client application 38, generally it requests it at the highest quality the bandwidth it has available can support. (Higher quality video will be larger in size, and so will require greater bandwidth.) The client application 38 receives video from the IIS web server 35, which it stores in a buffer. When the buffer contains a sufficient duration of video (i.e. a number of seconds of video), the client application 38 begin to display the video. If the client application 38 finds that the duration of video in the buffer has increased beyond a certain point, this indicates that additional bandwidth is available, and so the client application 38 increases the quality of the video it requests. Conversely, if the amount of video in the buffer falls beyond a certain point, this indicates that insufficient bandwidth is available, and so the client application 38 lowers the quality of the video it requests. In order to provide the differing qualities of video to the client application 38, the IIS web server 35 requires that fragmented MPEG-4 files are available that provide versions of the video being streamed in all the quality levels that may be required, so that it can provide them as and when requested by the client application 38.

FIG. 3 shows a typical use of files of differing qualities by an IIS web server 35 using Smooth Streaming. The IIS web server 35 has files 41 to 45 of qualities 150 Kb/s, 300 Kb/s, 600 Kb/s, 900 Kb/s and 2000 Kb/s respectively. Initially, the client application 38 requests video of quality 150 Kb/s from file 41. When a certain duration of video has been obtained, display of the video will begin. The buffer then continues to receive video from the file 41. As the bandwidth required by this low-quality video is small, the duration of video in the buffer quickly increases (as video is being received at a faster rate than it is being displayed), and once it exceeds a certain point the client application 38 requests the next-highest quality video of quality 300 Kb/s from file 42. This continues as the buffer continues to fill, with at appropriate points the client application 38 requesting video at higher and higher qualities. The duration of the video in the buffer may also fall below a certain point, for example due to a restriction in bandwidth, or because a change in the content of the video causes the same duration of video of the same quality of video to be larger in size (this is explained in more detail below). In this case, the client application 38 requests a lower quality of video. An example of this can be seen in FIG. 4 where the client application 38 is initially requesting the video of quality 2000 Kb/s from file 45, when the duration of video in the buffer falls below a certain point changes to requesting the video of lower quality 900 Kb/s from file 44, and then once the duration of video in the buffer has increased again returns to requesting the video of quality 2000 Kb/s from file 45.

When requesting video from the files 41 to 45, in practice the client application 38 requests moofs from the files 41 to 45 which contain video for the time period it requires. Details of the available moofs, i.e. the time periods that the moofs cover, is given in the manifest of the header 21. However, a disadvantage of this is that the size of the manifest is in linear proportion to the number of moofs in the file 20, which is again in proportion to the length of the file. This results can result in the manifest becoming very large for long video files.

Another disadvantage occurs where live video is being streamed, for example footage of a live sporting event, so the full content of the files 41 to 45 is not yet available. In this case, the manifest needs to be available before any moofs can be returned to the client application 38. This requires the duration of the video to be known in advance, which may not be possible if for example the sporting event overruns so the duration is longer than expected. Further, it means that the manifest necessarily indicates that all moofs in the file are available, when in fact for later moofs that will not yet be the case.

The present invention seeks to solve and/or mitigate the above-mentioned problems. Alternatively and/or additionally, the present invention seeks to provide improved methods of streaming media file data, and improved media file servers.

SUMMARY OF THE INVENTION

In accordance with a first aspect of the invention there is provided a method of streaming media file data, the method comprising the steps of:
 a) receiving a request for media file data for a desired time;
 b) determining from the desired time an available segment of media file data, wherein the segment includes media file data from a start time to an end time;
 c) returning the available segment of media file data;
wherein the step of returning the available segment of media file data includes returning information indicative of the start time to end time covered by the media file data of the available segment.

In this way, a request for media file data for any desired time can be made, regardless of the segments of media file data that are actually available, with a suitable available segment being determined and returned. As the start time and end time of the available segment are returned along with the segment of media file data itself, the requester of the media file data can use the media file data accordingly and in particular use the end time when making a subsequent request for media file data.

Preferably, the start time is equal to or before the desired time. The desired time may be between the start time and the end time inclusive. In this case, the returned segment of media file data includes media file data for the desired time. However, in other circumstances the desired time may be after the end time, in particular if a segment of media file data including media file data for the required time is not available. This may be the case where all the media file data is not yet available, for example where the media file data is for a live sporting event.

Preferably, the request for media file data includes desired properties for the media file data. Preferably, the desired properties include the quality of the media file data. This allows different qualities of media file data and/or media file data with other properties to be requested.

Preferably, the request for media file data is an HTTP request. In this case, advantageously the desired time is indicated by the requested URL. This allows standard HTTP caching techniques to be used where possible when providing the segments of media file data.

Advantageously, the method further comprises the step of receiving a request for further media file data beginning at the end time of the returned segment of media file data. In this way, the desired times of the requests for media file data will become aligned with the segments of media file data that are actually available. This is particularly advantageous where the desired time is indicated by an HTTP request using an URL indicating the desired time, as it becomes likely that the required reply to the HTTP request will be cached.

The media file data may be from a media file of fragmented MPEG-4 format. In that case, the available segment may be a moof.

In accordance with a second aspect of the invention there is provided a media file server for streaming media file data, arranged to perform any of the methods described above.

In accordance with a third aspect of the invention there is provided a computer program product arranged, when executed, to perform any of the methods described above.

In accordance with a fourth aspect of the invention there is provided a computer program product arranged, when executed on a computing device, to provide a media file server as described above.

It will of course be appreciated that features described in relation to one aspect of the present invention may be incorporated into other aspects of the present invention. For example, the method of the invention may incorporate any of the features described with reference to the apparatus of the invention and vice versa.

The segments described herein may comprise an encoding of a sequence of frames to be decoded together. That encoding may provide data compression. For example, the frames within a segment may be defined by reference to other frames within that segment. For example, frames within a segment (such as B-frames and P-frames) may be defined by reference to other frames (such as I-frames and P-frames), and those other frames are also included within that segment. For example, the segments may comprise essence data for media spanning a particular period of time within the longer period spanned by the media data file as a whole. The segments may be provided as separate data files. The segments may comprise moofs or GOPS. A manifest may be provided, e.g. in a header file, which can enable those segments to provide the complete media data file.

Determining an available segment from the desired time may comprise comparing the desired time to a manifest to determine the available segment which includes the desired time, the manifest comprising time data for each of a plurality of segments of the media file.

An aspect of the disclosure provides a media file system configured to:
 a) store media file data comprising a plurality of segments;
 b) receive a request for media file data for a desired time;
 c) determine from the desired time an available segment of media file data by comparing the desired time to a manifest to determine the available segment which includes the desired time, the manifest comprising time data for each of the plurality of segments;
 d) return the available segment of media file data;
wherein the step of returning the available segment of media file data includes returning information indicative of a time period covered by the media file data of the available segment.

The manifest may be stored in the media file system. The information indicative of a time period may comprise information indicative of the start time to end time covered by the media file data of the available segment. The time data in the manifest may comprise the start and/or end times for each of the plurality of segments. The desired time may lie between the start time and the end time (inclusive) of a particular segment.

The request for media file data may include desired properties for the media file data. The desired properties may include the quality of the media file data.

The request for media file data may be received in a network message, such as a hypertext transfer protocol request. The network message may comprise a request for data from a URL, for example the URL may indicate the desired time.

Embodiments may respond to such a network message by sending a redirect message configured to cause the client which sent the request to send a new request to a URL indicated in the redirect message. For example, the redirect message may comprise a URL of the available segment. For example, the URL of the available segment may comprise the information indicative of a time period covered by the media file data.

The media file data may be from a media file of a segmented format, for example a fragmented MPEG-4 format, for example wherein the available segment comprises one of a moof and a GOP.

Further, the manifest may be stored in the media file system, and is not accessible to a media file data requesting device. In one example, a media file requesting device may be a client application that requests media files, essence data, or other content, from the video streaming device, or media file system.

Still further, the manifest may further comprise the end times for each of the plurality of segments.

Still further, the request for media file data may comprise a network message. The network message may for example, comprise a hypertext transfer protocol request.

In accordance with a further aspect of the present invention there is provided a media file system configured to:
  a) store media file data comprising a plurality of segments; and
  b) receive a request for media file data for a desired time;
  c) determine from the desired time an available segment of media file data by comparing the desired time to a manifest to determine the available segment which includes the desired time, the manifest comprising time data for each of the plurality of segments;
  d) return the available segment of media file data;
wherein the step of returning the available segment of media file data includes returning information indicative of the time period covered by the media file data of the available segment.

Further, the manifest may be stored in the media file system, and is not accessible to a media file data requesting device. In one example, a media file requesting device may be a client application that requests media files, essence data, or other content, from the video streaming device, or media file system.

Still further, the manifest may further comprise the start times for each of the plurality of segments.

Still further, the manifest may further comprise the end times for each of the plurality of segments. A combination of the start and end times of the plurality of segments may be stored in the manifest.

Still further, the request for media file data may comprise a network message. The network message may for example, be a hypertext transfer protocol request.

DESCRIPTION OF THE DRAWINGS

Embodiments of the present invention will now be described by way of example only with reference to the accompanying schematic drawings of which.

DETAILED DESCRIPTION

Figure 4:
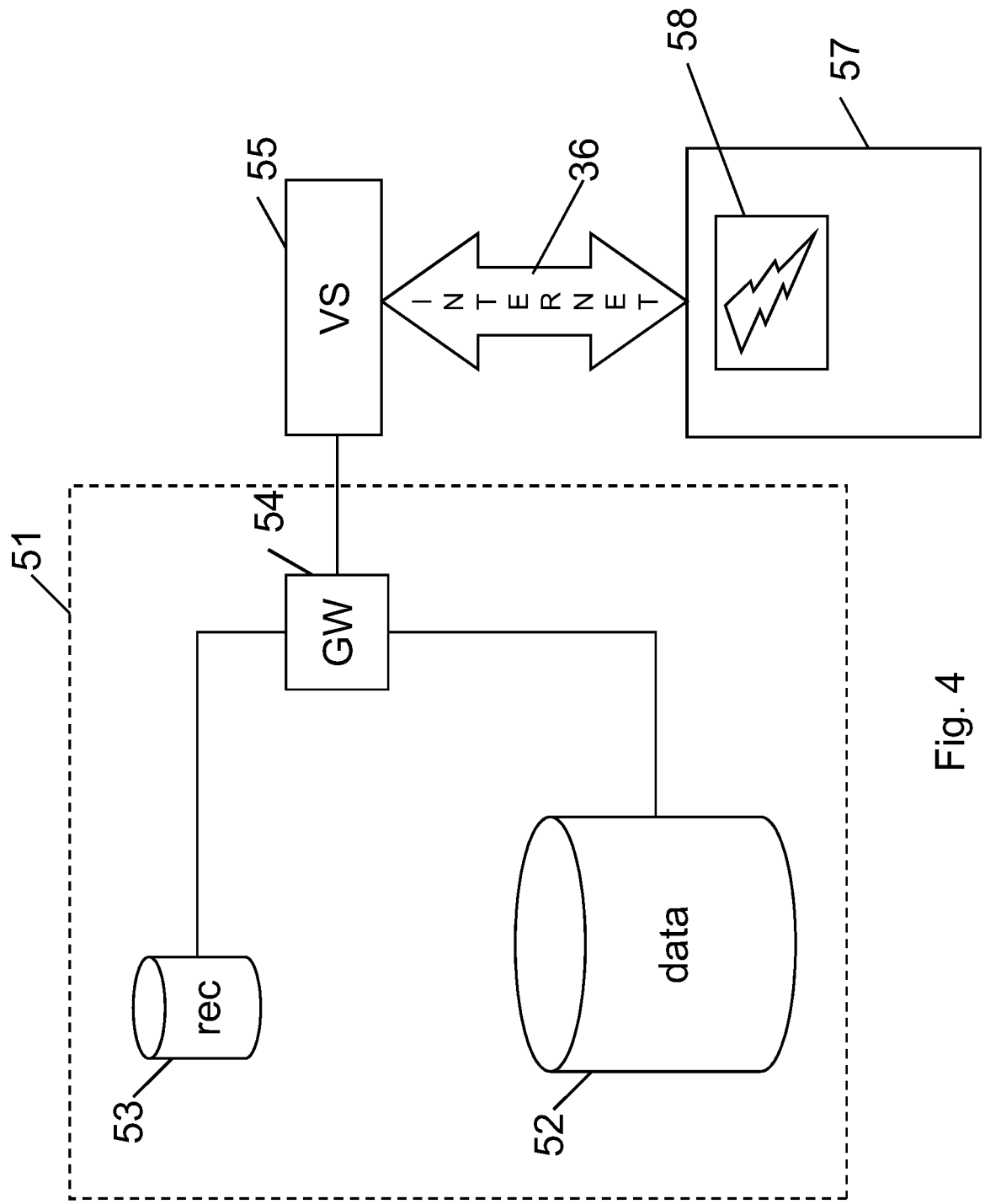
FIG. 4 is a schematic diagram of a video streaming computer system in accordance with a first embodiment of the present invention.

A video streaming computer system in accordance with a first embodiment of the invention is shown in FIG. 4. As with the known video streaming computer system described above, the video streaming computer system of the present embodiment comprises a file system 51, which comprises a data store 52, a file record database 53, and a file system gateway 54. The file system gateway 54 of the file system 51 is in communication with a video steaming server 55, which can communicate via the Internet 36 with a personal computer 57 running a video streaming client application 58.

As in the known video streaming computer system, the video streaming computer system of the present embodiment provides file data for the fragmented MPEG-4 format files of differing qualities in response from requests from client applications. However, the skilled person will appreciate that the file system 51 could equally be used with other file formats for which a file is split into segments.

Figure 1:
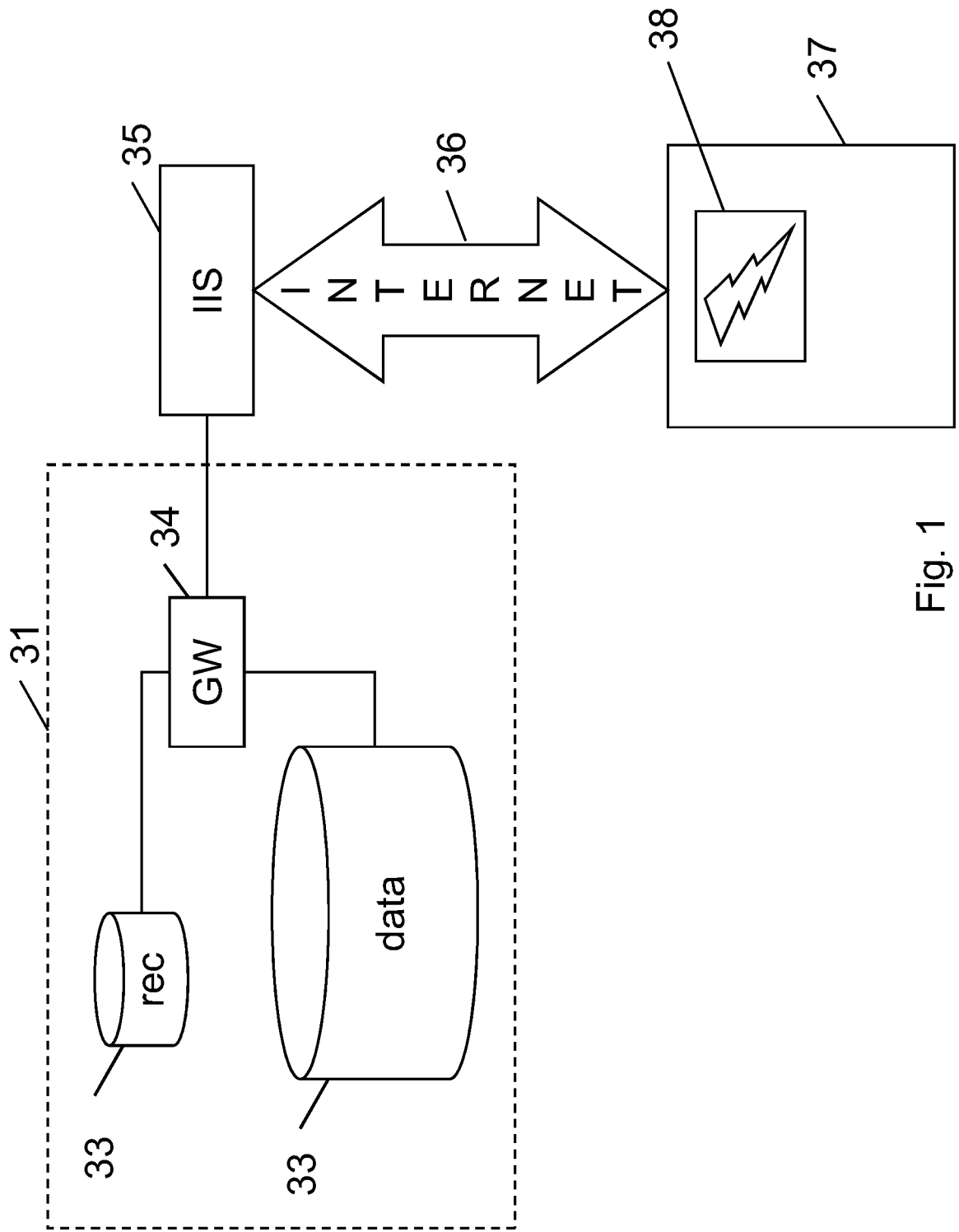
FIG. 1 is a schematic diagram of a known video streaming computer system running the Smooth Streaming media service.
Figure 2:
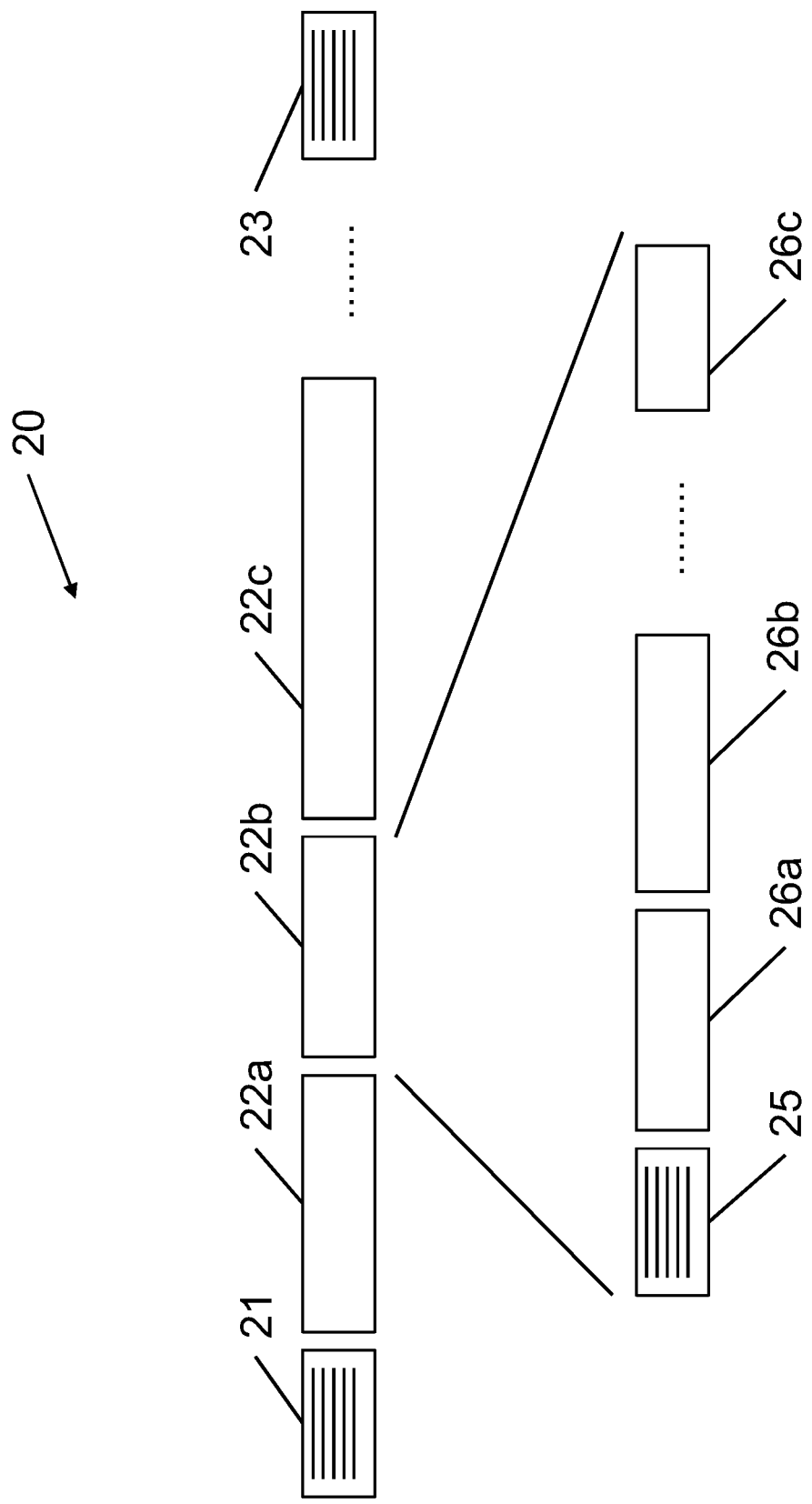
FIG. 2 shows the structure of a fragmented MPEG-4 file.
Figure 3:
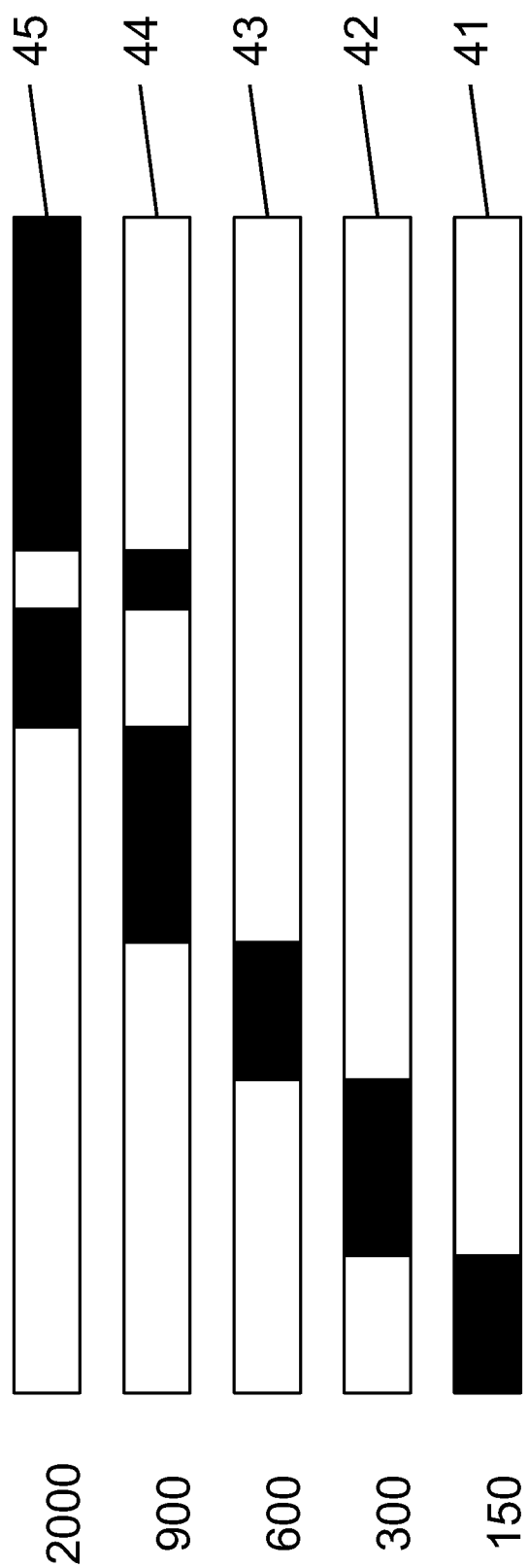
FIG. 3 shows the use of files by the system of FIG. 1.

An exemplary structure of a fragmented MPEG-4 is shown in FIG. 2. A file 20 comprises a header 21, a plurality of "moof"s (movie fragments) 22a, 22b, 22c and so on, and a footer 23. Each moof provides a portion of video of a fixed duration, for example two seconds of video. Optionally, other codecs may be used in some embodiments, and some embodiments of the present invention may not be limited to the specific codec of MPEG 4, but rather may utilise alternative codecs.

FIG. 2 further shows an exemplary internal structure of a moof. A moof comprises a header file 25 and a plurality of GOPs ("groups of pictures") 26a, 26b to 26c. A GOP is a representation of a group of pictures that can be stored in a compressed form. A GOP may be a series of images making up a particular sequence of video. The images may be compressed, and as can be seen from FIG. 2 this results in the GOPs being of different lengths (i.e. being made up of a different number of bytes). One reason for this is that the video a GOP represents will compress to a different size depending on the nature of the images making up the video; for example, as compression techniques include identifying the differences between images in a series, a series of very similar images will generally be compressed to a much smaller size than a series of images which differ substantially from each other. The location of a GOP in a file will therefore depend on the size of the preceding GOPs.

The header 21 may contain in XML format a "manifest" giving details of the moofs in the file 20 and the time ranges for the video they contain. For example, the manifest of the header 21 may indicate that moofs 22a, 22b and 22c provide video in the time ranges 0-2 seconds, 2-4 seconds and 4-6 second respectively.

The footer 23 may contain in XML format an index giving details of the byte ranges for the moofs in the file 20. As can be seen in FIG. 2, even though each moof contains a fixed duration of video, the moofs themselves are of variable length. Thus, the byte range for a moof in the file 20 cannot be determined merely from its time range, and the index of the footer 23 is required in order to find a particular moof within the file 20.

Optionally, other types of media file may also be structured into segments. That is each segment is a distinct file containing a portion of the media file data, or essence data. When the segments are combined, in order, they create the completed media file. Examples of segments include moofs, GOPs or fragmented MPEG 4 files. Each segment may be sent individually, or as part of a group of segments in a file transfer. Such a file transfer may include the video streaming computer system sending a requested media file to a client application. In that case the segments may be sent one by one, on request, or as a group. Alternatively, as described below, the client application may request a time in the media file and the video streaming computer system is configured to determine from the desired time an available segment of media file data by comparing the desired time to start times of segments in the manifest to determine the available segment which includes the desired time. The available segment may then be returned to the client application.

Details of the available moofs, i.e. the time periods that the moofs cover, is conventionally given in the manifest of the header 21 that is therefore available to inspection by the client application, as described above with reference to FIG. 2. However, a disadvantage of this is that the size of the manifest is in linear proportion to the number of moofs in the file 20, which is again in proportion to the length of the file. This can result in the manifest becoming very large for long video files. Therefore optionally, in some embodiments the manifest of files, such as a manifest of moofs, GOPs or MPEG-4 files or any other segment file, may not be contained within the file itself, but rather is stored locally in the video computer streaming system, or apparatus. This reduces the length of the video file, but means that the client device is not able to request specific segments directly using the manifest.

Figure 5:
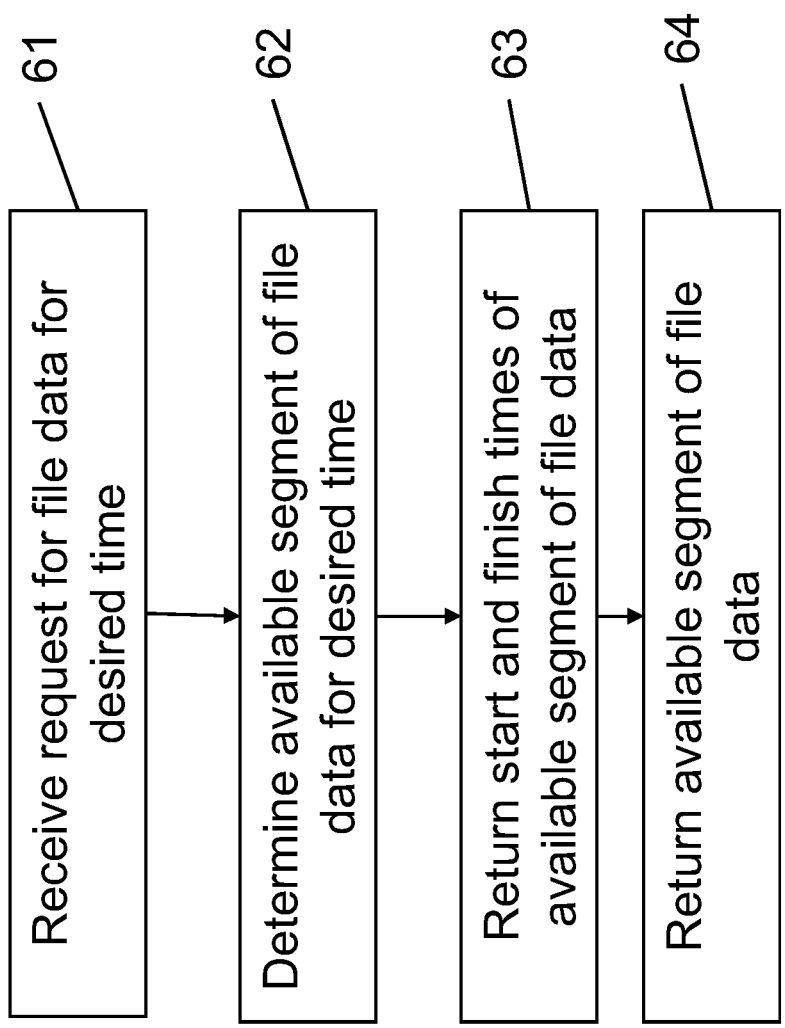
FIG. 5 is a flow chart showing the operation of the video streaming server of the video streaming computer system of FIG. 4 in response to a request for file data.

The operation of the video streaming server 55 in response to a request for a segment of file data is now described with reference to the flowchart of FIG. 5.

First, the video streaming server 55 received a request for file data for a desired time from the client application 58 (step 61). This request may be in the form of an HTTP request where the desired time is indicated by the URL. Other desired properties of the file data may also be indicated by the URL, for example the quality of video required. Thus, the URL request may for example be:

http://example.com/video1/300/43 where this indicates that a segment of video1 is required at quality 300 Kb/s, that includes video for the time 43 seconds (from the start of the video).

The video streaming server 55 then determines what available segments of file data it has that it can return in response to the request (step 62), i.e. which segments are available from the file system 51. It may that a segment of file data at the required quality (300 Kb/s) and beginning at the desired time (43 seconds) is available. However, it may be that no segment of file data is available that begins exactly at the desired time. It may be the case that, for example, the segments of file data in the file system 51 are only available in 5-second increments. In this case, the available segment of file data is the segment that includes the desired time, in other words the segment beginning at time 40 seconds and ending at time 45 seconds.

Another possibility occurs if not all the content of the video being streamed is available when the request is made, for example if the video is of a live sporting event. In this case, the desired time may be for file data that is not yet available. In this case, the available segment of file data is the last available segment of file data. (It will be appreciated that in this case the available segment of file data could be determined in other ways, for example to return the segment beginning 30 seconds before the last available segment to try to minimise the chance of buffering being an issue, or the available segment instead being the first segment.)

Once the available segment of file data has been determined, the start and finish times of the available segment are returned to the client application 58 (step 63), and then the file data of available segment itself is returned to the client application 58 (step 64). The start and finish times are returned in the HTTP header for the file data of the available segment, along with the desired time that was actually requested.

In one embodiment, HTTP redirects are used to translate requests for segments of file data that are not available into requests for the determined available segments. However, it will be appreciated that in other embodiments, other methods could be used.

Figure 6:
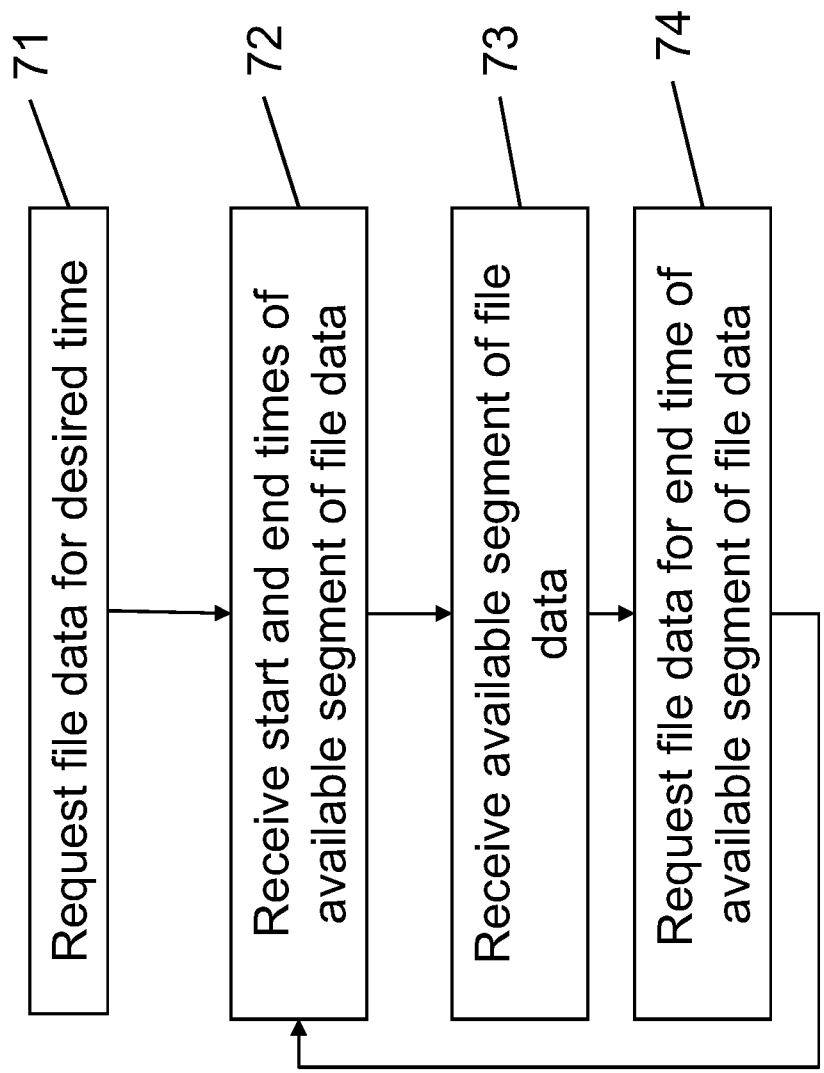
FIG. 6 is a flow chart showing the operation of the client application of the video streaming server of the video streaming computer system of FIG. 4 when requesting for file data.

The operation of the client application 58 when requesting a segment of file data is now described with reference to the flowchart of FIG. 6.

First, the client application 58 requests a segment of file data for a particular time from the video streaming server 55 (step 71). In the present example, it is assumed again that the desired time is 43 seconds, and that video of quality 300 Kb/s is required. The request is then made using the URL as described above.

In response to making the request, the client application receives start and end times for an available segment of file data from the video streaming server 55 (step 72), which in this case are the times 40 seconds and 45 seconds respectively. The client application 58 then receives the file data for the available segment itself (step 73). The client application 58 can use this to display video to a user. The client application 58 may display the video beginning at the time 43 seconds, or may display it from the beginning, i.e. from 40 seconds.

Once all of the available segment of file data has been received (and displayed or buffered for display when required), the client application 58 requests the next segment of file data it requires. Now, the client application 58 requests a segment of file data where the desired time is the end time of the previous segment (step 74), i.e. for time 45 seconds in this case. The process then repeats with the client application 58 receiving segments of file data from the video streaming server 55 and requesting subsequent segments (steps 72, 73 and 74 repeated).

In this way, the client application 58 can request segments of file data from the video streaming server 55 for particular times, even if those times do not correspond to the start times of segments available to the video streaming server 55 to return. Further, once a first segment of file data has been returned, the client application 55 will request segments of file data that are available to the video streaming server 55, as for each subsequent segment the desired time requested will be the end time of the previous segment. In the present embodiment where the requested URL indicates the desired time, this is particularly advantageous as it means the video streaming server 55 can use standard HTTP caching techniques when providing the segments.

The manifest may be stored at the video streaming server, for example it be withheld from the client. The client application may be unable to specifically request the time corresponding to the beginning of a segment.

Optionally, the client making the request is not aware of the start time(s) of the segments when making the request, so cannot request a time corresponding to a segment start time.

The manifest may comprise time data for a media file. The manifest may be stored in a data store 33 at the media file server. It may be provided as part of a header of the media file. The time data may include the start times of segments in the media file. The time data may also include the end times of the segments. Both the start and the end times of each segment may be stored in the manifest. The manifest may not be complete, and may be updated as media data is added to the file. For example, it may be updated in response to the receipt of new content (e.g. essence data) for the media file. For example, for a live streaming event, the manifest may be updated as new essence data is added. In some embodiments the manifest is stored locally in the media file system, or video streaming device. In such an embodiment the manifest may be withheld from the client application or media file data requesting device. The manifest may not be sent at all to the client, or may be protected or hidden so that it is not accessible or readable by the client.

In some embodiments the video streaming device comprising a media file system, receives a request from a client for content at a desired time. The desired time is then compared with the time data stored in the manifest. The manifest is stored within the media file system. In some embodiments the client may not have access to the manifest. The media file system, video streaming device (or a processor incorporated into such a device) is configured to determine based on the desired time which of the segments stored in the media file system to return to the client application. This determination is based upon which segment the desired time falls within. The determined available segment is then returned to the client application. The media file system, or video streaming device, may send along with the available segment information indicative of the time period covered of the available segment. The desired time that was requested by the client may also be returned.

It will be appreciated from the discussion above that the embodiments shown in the Figures are merely exemplary, and include features which may be generalised, removed or replaced as described herein and as set out in the claims. With reference to the drawings in general, it will be appreciated that schematic functional block diagrams are used to indicate functionality of systems and apparatus described herein. For example the functionality provided by the file record database 33, or data storage, may in whole or in part be provided by a processor. In addition the processing functionality may also be provided by devices which are supported by the video streaming device. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The processor of the video streaming device (and any of the activities and apparatus outlined herein) may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof. Such data storage media may also provide the data storage 33 of the video streaming device.

In some embodiments the file system gateway 34 is an interface configured to connect the media file system, or video streaming device, with a client application such as a media file data requesting device. Such a connection may be via a local area network, or a wider area network. Any suitable network may be used in the present invention. Examples of local area networks include, but are not limited to Ethernet, Wi-Fi, Bluetooth or other such technologies. Whilst wide area networks include, but are not limited to, the internet and GSM, or other such technologies.

In some embodiments the segments stored in the media file system may comprise essence data compressed according to the codec of the media file and relating to a defined time period of the media (e.g. audio, visual or audio-visual data) contained by the file. They may be part of any codec, and are not limited to an MPEG 4 codec. The segments may be GOPs, moofs, or other files. Other codecs include, but are not limited to, Ogg, ASF, Quicktime, RealMedia, Matroska, DivX Media Format, and ISO. A segment is a part of a media file system that may be sent used, or otherwise manipulated, independently of the rest of the media file. A segment may also be used, sent, or otherwise manipulated in conjunction with other segments.

While the present invention has been described and illustrated with reference to particular embodiments, it will be appreciated by those of ordinary skill in the art that the invention lends itself to many different variations not specifically illustrated herein.

The invention claimed is:
1. A media file system comprising:
    an input configured to receive, from a client application, a request for media file data starting at a desired time within a media file, with the request from the client application defining the desired time independently of a start time of a plurality of predefined segments of the media file;

an available segment selector configured to determine whether the media file data contains an available segment by comparing the desired time to a manifest to determine the available segment according to a start time and an end time of the available segment within the media file, wherein the manifest comprises time data for each of the plurality of predefined segments; and a segment output configured to return, to the client application, a separate file that includes only the available segment of media file data when the media file data is determined to contain the available segment and, in a header of the returned separate file, information indicative of a time period covered by the available segment including information indicating the desired start time that is defined in the request from the client application.

2. The media file system according to claim 1, further comprising a database configured to store the media file data of the media file.

3. The media file system according to claim 1, wherein the desired time does not correspond to the start time of any of the plurality of predefined segments.

4. The media file system according to claim 1, wherein the desired time is between the start time and the end time inclusive of one of the plurality of predefined segments.

5. The media file system according to claim 1, wherein the request for media file data includes desired properties for the media file data, which include a format quality of the media file data.

6. The media file system according to claim 1, wherein the request for the media file data is an HTTP request that indicates the desired time by a requested URL associated with the HTTP request.

7. The media file system according to claim 1, wherein the media file data is from the media file comprising a fragmented MPEG-4 format.

8. The media file system according to claim 7, wherein the available segment is one of a moof and a GOP.

9. The media file system according to claim 1, further comprising a network message responder configured to respond to a network message including the request by sending a redirect message to redirect the request, wherein the redirect comprises a URL of the available segment.

10. A media file system comprising:
an available segment selector configured to determine whether a media file data contains an available segment by comparing a desired time, which is defined in a media file data request from a client application, to a manifest to determine the available segment according to a start time and an end time of the available segment, wherein the manifest comprises time data for each of a plurality of predefined segments of at least one media file; and a segment output configured to return, to the client application, a separate file that includes only the available segment of media file data when the media file data is determined to contain the available segment and, in a header of the returned separate file, information indicative of a time period covered by the available segment including information indicating the desired start time that is defined in the request from the client application.

11. The media file system according to claim 10, further comprising an input configured to receive, from the client application, the request for media file data that defines the desired time independently of a start time of any of the plurality of predefined segments of the at least one media file.

12. The media file system according to claim 10, further comprising a database configured to store the media file data of the at least one media file.

13. The media file system according to claim 11, wherein the desired time does not correspond to the start time of any of the plurality of predefined segments.

14. The media file system according to claim 10, wherein the request for media file data includes desired properties for the media file data, which include a format quality of the media file data.

15. The media file system according to claim 11, wherein the request for the media file data is an HTTP request that indicates the desired time by a requested URL associated with the HTTP request.

16. The media file system according to claim 10, wherein the media file data of the at least one media file comprises a fragmented MPEG-4 format that is one of a moof and a GOP.

17. A method comprising:
determining whether a media file data contains an available segment by comparing a desired time to a manifest to determine the available segment according to a start time and an end time of the available segment within the media file, wherein the manifest comprises time data for each of a plurality of predefined segments, wherein the desired time is defined in a media file data request from a client application;

returning, to the client application, a separate file that includes only the available segment of media file data when the media file data is determined to contain the available segment; and returning, in a header of the returned separate file, information indicative of a time period covered by the available segment including information indicating the desired start time that is defined in the request from the client application.

18. The method of claim 17, further comprising: receiving, from the client application, the request for media file data that defines the desired time independently of a start time of any of the plurality of predefined segments of the media file.

19. The method of claim 17, wherein the desired time does not correspond to the start time of any of the plurality of predefined segments.

20. The method of claim 17, wherein the request for the media file data is an HTTP request that indicates the desired time by a requested URL associated with the HTTP request.

* * * * *